United States Patent [19]
Courtot

[11] 3,812,738
[45] May 28, 1974

[54] FLEXIBLE CABLE ASSEMBLY
[75] Inventor: Louis B. Courtot, Euclid, Ohio
[73] Assignee: The Weatherhead Company, Cleveland, Ohio
[22] Filed: Apr. 6, 1972
[21] Appl. No.: 241,776

[52] U.S. Cl............................. 74/501 R, 74/501 P
[51] Int. Cl. ............................................. F16c 1/10
[58] Field of Search........... 74/501, 501 P; 264/168, 264/173; 425/113, 131, 381

[56]  References Cited
UNITED STATES PATENTS
3,581,523   6/1971   Bartholomew .................... 74/501 P Primary Examiner—Samuel Scott
Assistant Examiner—Frank H. McKenzie, Jr.
Attorney, Agent, or Firm—McNenny, Farrington, Pearne & Gordon

[57] ABSTRACT

A control cable assembly, method and apparatus for its manufacture wherein a casing includes a flexible plastic body portion having a longitudinal bore in which are formed axially and circumferentially spaced plastic projections which cooperate to radially and slidably support a wire core therein. In one embodiment the projections are formed as elongated filaments or cilia having a non-axial orientation to improve cable efficiency under bending conditions and in reversal of wire movement.

3 Claims, 5 Drawing Figures

PATENTED MAY 28 1974 3,812,738

FLEXIBLE CABLE ASSEMBLY

BACKGROUND OF THE INVENTION

The invention relates to control cable assemblies which generally comprise a flexible tubular casing and a wire core slidably supported in the casing and, in particular, the invention provides improvements in such casings and a method and apparatus for their production.

Control cables, sometimes called Bowden cables, are used to transmit mechanical force or movement from one location to another generally along a curved path. A tubular casing of a cable assembly is normally anchored at its ends adjacent these locations and a wire core or cable in the casing is either pushed or pulled manually or otherwise at one end while at the other end it is fastened to an object to be controlled. In certain types of prior cable assemblies, the outer casing has been constructed of a continuous metallic wire wound in a tight helix. If this casing wire is round or similarly shaped, a shallow space or pocket is formed between adjacent coils where a lubricant may be placed to reduce sliding friction between the casing and wire core. The coiled metal wire casing construction has the disadvantage of being relatively expensive and in many applications and environments it is subject to corrosion which generally results in unsatisfactory operation or complete failure.

More recently, commercial cable assemblies have been constructed of extruded plastic materials forming at least the inner bore of the casing. This use of plastic has the advantage of eliminating corrosion at the inner casing bore and resulting problems. But, where the bore is extruded as a smooth cylindrical wall, there exists no lubricant retaining areas or pockets so that any lubricant in the assembly is soon squeezed or otherwise worked out of the casing bore when the assembly is operated.

SUMMARY OF THE INVENTION

The invention provides an improved plastic casing for a control cable assembly in which the bore of the casing includes circumferentially and axially spaced projections which cooperatively slidably support a wire cone therein. Spaces or pockets formed between the projections are adapted to store lubricant for minimizing sliding friction between the wire core and the casing throughout the service life of the assembly.

In accordance with the invention, the axial spacing between the internal casing projections allows the casing to be flexed to conform to a desired cable routing while the bore is not significantly constricted around the core. This results because the material forming the projections is not substantially axially strained in compression and therefore is not deformed radially inwardly, when the casing is flexed. Additionally, the spaces between the projections provide room for local radial deformation of the plastic material at the base of each projection to reduce inward radial movement of the projections on the inside of a curve taken by the assembly. The effect achieved is similar to that produced while bending a circumferentially corrugated tube without causing a significant collapse of its cross section. Further, the circumferential spacing between the projections provides axial paths allowing lubricant to continuously distribute itself with use evenly along the length of the assembly.

In the preferred embodiments disclosed below, the main body of a casing is formed by extruding plastic material through an annular nozzle. Additional plastic material is intermittently deposited on a cylindrical inner wall formed by the nozzle to develop the desired axially and circumferentially spaced internal projections. Ideally, the additional plastic material is axially conveyed through a mandrel which forms a center portion of the annular nozzle. At an outer end of the mandrel, the additional material is fed against the inner cylindrical casing wall where it fuses or adhesively combines with the plastic material forming the main body of the casing.

As disclosed, valve means are provided to regulate the rate and duration of feed of the additional plastic material whereby the length and shape of the projections is controlled to provide various suitable casing bore structures. Additionally, means are provided to rotate the mandrel relative to the remainder of the extrusion nozzle whereby the projections are angularly distributed on the interior of the casing to produce full radial support for the wire core.

DESCRIPTION OF THE PREFERRED EMBODIMENTS

Figure 1:
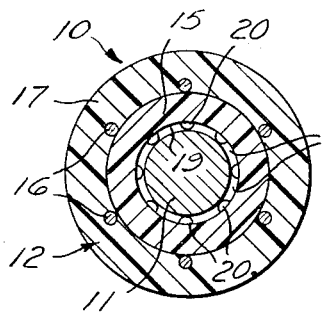
FIG. 1 is a transverse cross-sectional view of a first embodiment of a cable assembly in accordance with the invention.
Figure 2:
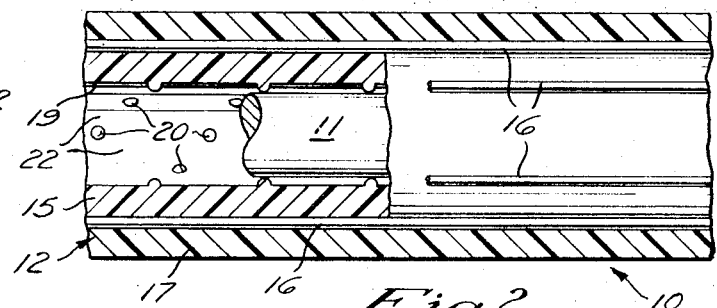
FIG. 2 is a longitudinal view of the assembly of FIG. 1 with certain portions in section and other portions broken away to illustrate details of the assembly.

Referring now to FIGS. 1 and 2, there is shown a length of cable assembly 10 which includes an inner load transmitting metallic or nonmetallic core 11 and a tubular casing body, designated generally at 12. Preferably, the core 11 is a single circular flexible metal wire, such as piano wire, capable of sustaining both axial compressive and tensile forces for so called push-pull operation. Alternatively, the core 11 may be provided in the form of a multi-element stranded metallic or nonmetallic cable for use primarily in pull operation where the core is subjected primarily to tensile loads.

As shown, the tubular casing body 12 is an assembly of an inner tubular casing 15, a plurality of axially aligned angularly spaced reinforcing wires or filaments 16 and an outer tubular casing 17. The material forming the outer casing 17 is, preferably, a plastic such as nylon and is chosen with regard to the intended manner of applying it to the inner casing 15. Other factors, of course, such as the environment and service conditions in which the assembly 10 is used will effect the choice of casing materials. The outer casing 17, of course, must be formed of a plastic material which is flexible enough to permit the assembly to be routed along a curved path of a minimum expected radius.

As illustrated, the longitudinal reinforcing wires 16 are embedded in the outer tubular casing 17. It may be appreciated, that, alternatively, these reinforcements 16 may be provided in the inner tubular casing 15 or may be eliminated altogether where service loads are relatively light. Similarly, both the reinforcements 16 and the outer casing 17 may be eliminated in proper circumstances as long as the final structure of the casing 15 has sufficient axial strength to accommodate axial tensile and/or compressive working forces in the core 11.

In the embodiment illustrated in FIGS. 1 through 4, the inner tubular casing 15 has formed on an interior cylindrical wall 19 a multitude of projections or bumps 20. Collectively, the projections 20 define by their radially inward surface areas a guideway for radially and slidably supporting the core 11 therein. As seen most clearly in FIG. 1, the projections 20 support the core 11 off of the interior cylindrical surface 19 so as to provide clearance areas or pockets 22 in which a suitable lubricant may be provided. According to the principles of the invention disclosed below, the inner tubular casing 15 may be formed by an extrusion process. After the inner casing 15 is formed, the outer casing 17 may be extruded or pulled over it in accordance with known fabrication techniques.

Figure 3:
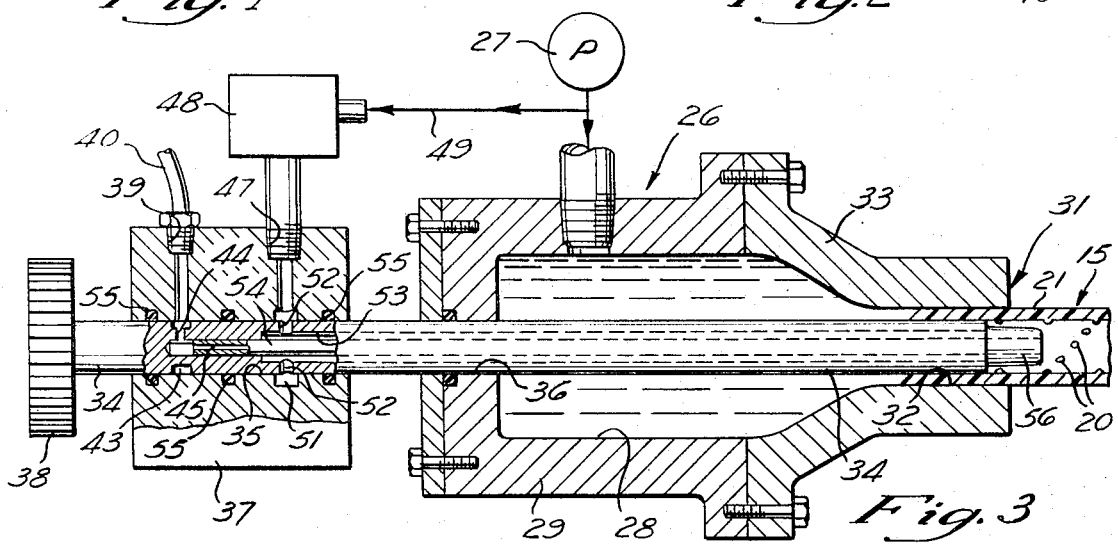
FIG. 3 is a longitudinal sectional view of apparatus for producing a casing tube for a cable assembly in accordance with the invention.
Figure 4:
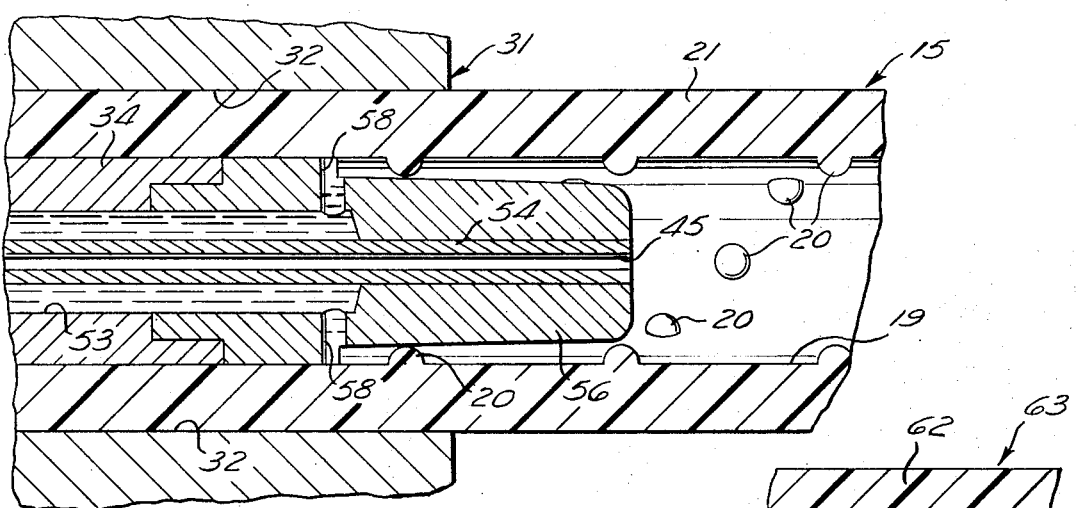
FIG. 4 illustrates an outer end of an extrusion nozzle of the apparatus of FIG. 3 on an enlarged scale.

Referring now in particular to FIGS. 3 and 4, there is illustrated apparatus 26 for producing the inner tubular casing 15 in accordance with the invention. The apparatus 26 includes a pump schematically represented at 27 for continuously feeding or supplying extrudable plastic material to a chamber or cavity 28 in a die housing 29 under pressure. At an outer end 33 of the housing 20 there is provided an extrusion nozzle 31 having an annular cylindrical opening therein defined outwardly by a cylindrical bore 32. Inwardly, the annular nozzle opening is defined by a generally cylindrical elongated mandrel or member 34. Plastic material from the pump 27 which is extruded through the nozzle 31 forms a main body portion 21 of the inner casing 15.

The mandrel 34 extends rearwardly through a sealed aperture 36 in an end wall of the housing 29. At the left of the die housing 29, there is provided a support block 37 in which the mandrel 34 is rotatably supported in a cylindrical bore 35. Means in the form of a spur gear 38 and a power source, not shown, are provided to rotate the mandrel 34 for purposes discussed below. The support block 37 includes a port 39 into which an air supply line 40 is threaded. Air or other fluid supplied by this line 40 under pressure is directed to an annular peripheral groove 43 and a radial hole 44 in the mandrel 34 to a central passage 45 extending to the end of the mandrel. In a known manner, fluid pressure through these passages 43, 44 and 45 is utilized to internally support and size the extruded product or inner casing 15.

A second port 47 in the support block 37 is connected to a flow regulating or control valve represented at 48. Additional plastic material, which ultimately forms the projections 20 on the interior cylindrical surface 19 of the inner casing 15 is supplied or fed from a source such as the pump 27 through a line 49, or any other similar source and may be either the same material as used for the inner casing or one that adheres to it, through this control valve 48 and port 47. The port 47 leads to an internal annular recess 51 in the block bore 35 through which the additional plastic material flows into encircled radial holes 52 in the mandrel 34.

The radial holes 52 extend from the outer surface of the mandrel 34 radially inwardly to a longitudinal cylindrical bore 53 running along substantially the full length of the mandrel 34. An elongated narrow tube 54 providing the central air passage 45 isolates the supply of air from the additional plastic material in the longitudinal bore 53. Various circular seals 55 prevent axial leakage or air and/or plastic material in the block 37.

Referring now in particular to FIG. 4, the additional plastic material from the control valve 48 flows axially along the longitudinal bore 53 into a zone encircled by the cylindrical bore 32. At its outer end, the mandrel 34 includes a circular body or tip 56 in which the elongated narrow tube 54 terminates and in which the longitudinal mandrel bore 53 communicates with one or more radially extending passages 58. The radial passages 58 direct the additional plastic material into contact with the internal cylindrical surface 19 of the main body 21 of the inner casing 15.

Rotation of the mandrel 34 by the spur gear 38 causes the projections 20 to be formed on the inner cylindrical surface 19 in a helical or spiral pattern. The helix angle depends on the rate of rotation of the mandrel 34 relative to the rate of extrusion of the main body 21 of the casing 15. The number of projections 20 formed on the inner surface 19 of the casing 15 depends on the number of radial passages or ports 58 in the end of the mandrel 34 and the pulse rate or frequency of opening and closing of the control valve 48. The length of the projections 20 formed in the inner casing 15 depends on the duration of a period of flow through the control valve 48 in relation to the rate of extrusion of the main body 21 of the casing. In the embodiment illustrated in FIGS. 1-4, a short feed pulse with a rapid shut-off is employed to form the button like projections 20 which are short in length in comparison to their width at their base or area of attachment with the cylindrical surface 19.

Figure 5:
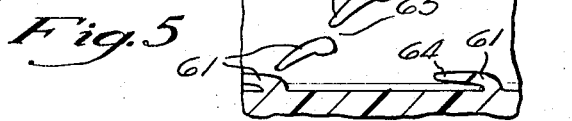
FIG. 5 is a fragmentary longitudinal sectional view of a casing tube in accordance with a second embodiment of the invention.

Referring to a second embodiment of the invention illustrated in FIG. 5, an inner tubular casing 63 for a control cable assembly includes internal body projections formed as elongated filaments or cilia 61. Axial and circumferential spaces or pockets 65 are provided between the projections 61 to retain suitable lubricant. The projections 61 are dimensionally long in comparison to their base or point of attachment to an inner cylindrical wall 66 of a main body 62 of the casing 63.

The casing 63 is produced by the apparatus 26 disclosed above in the same manner described for forming the casing 15 except that the control valve 48 is operated somewhat differently. The control valve 48 is held open for a relatively longer period of time during each feed cycle to produce a lengthened projection 61. Ideally, the flow rate of additional material through the control valve 48 is also gradually reduced by a slow shut-off during a feed cycle to produce a tapered end 64 on each projection 61.

Collectively, the radially inner surfaces of the elongated projections 61 form a guideway for a wire core which when properly lubricated acts to produce extra lubricity under bending conditions in the casing 63. As in the case of the first embodiment described above, the projections 61 minimize total contact area with an inner core and provide lubricant retaining pockets therebetween to reduce friction and improve efficiency. A non-axial or helical orientation of the projections 61 is produced by rotation of the mandrel 34. The non-axial orientation permits the projections 61 to shift slightly axially in response to movement of a wire core therein to improve uniformity of operation when the wire core changes its direction of movement.

The main bodies 21, 62 of the inner tubular casings 15, 63 may be formed of any settable plastic material, either thermoplastic or thermo-setting, which may be extruded and which in its finished condition is flexible enough for use as a control cable assembly. The additional material used to provide the projections 20, 61 may likewise be any plastic material, either thermoplastic or thermo-setting, which is adapted to adhere or fuse to the inner wall of a casing body when contacting it and which forms a rigid or semi-rigid projection. Preferably, the projection material is a settable material that is provided in a substantially liquid state as it is fed through the mandrel 34. Either the material forming the main body portion or that forming the projections or both is in an adhesive or fusible condition at the area where these materials are brought into contact. A suitable example of these materials for forming both the casing body and the projections is nylon. Of course, the body portions and the projections may be of different materials chosen so that their properties suit their particular function. For example, the additional material forming the projections may be impregnated with a lubricant such as graphite while the casing body material need not contain such an additive.

Although the foregoing description has made reference to cable assemblies for use in push-pull type service, it is contemplated that the disclosed assemblies and modifications thereof are adapted to be used in flexible shaft applications where rotary motion is transmitted or in applications where combined axial and rotary movement is desired.

While preferred embodiments of the invention have been shown and described in detail, it is understood that the invention can take many other forms and embodiments, and such forms and embodiments as may occur to those skilled in the art may be resorted to without departing from the scope of the invention as defined in the following claims.

What is claimed is:

1. A cable assembly comprising an elongated flexible tube and a flexible core extending through the tube, said tube having an axial compressive strength sufficient to sustain tensile working forces in the core, said tube being formed at least in part by a flexible plastic casing, said casing providing an interior tube surface having axially and circumferentially spaced raised projections, said projections being dimensioned to provide radially inner surfaces collectively defining a core guideway adapted to radially and slidably support said core, the axial length of the base of said raised projections being relatively small in relation to the diameter of said interior tube surface, the flexibility of the tube and the core permitting the assembly to be routed along a curved path while the axial spacing between adjacent projections minimizes radial constriction of the guideway and consequent binding of the core and while the circumferential spacing between the projections is adapted to permit continuous axial migration and distribution of lubricant retained in the casing between said projections, said projections being elongated and having a free length greater in dimension than their width at base areas where they join a main body portion of the casing.

2. A cable assembly as set forth in claim 1 wherein said projections have a non-axial orientation.

3. A force transmitting flexible cable assembly comprising an elongated flexible plastic tubular casing, a wire core extending through the casing, said casing having a cylindrical inner bore surface, a multitude of axially and circumferentially spaced elongated filaments collectively supporting said wire core in said bore, a base of each filament being formed at said cylindrical inner bore surface, said filaments freely extending lengthwise from their bases inwardly from said inner bore surface, the free length of said filaments being substantially greater than their base dimensions whereby said filaments are adapted to shift with movement of said core relative to said casing and said filaments are adapted to produce extra lubrication from spaces between adjacent filaments when said casing is subjected to bending.

* * * * *